Aug. 25, 1964    M. NOBEL    3,146,020
WINDSHIELD ARRANGEMENT FOR VEHICLE
Filed Dec. 15, 1960    2 Sheets-Sheet 1
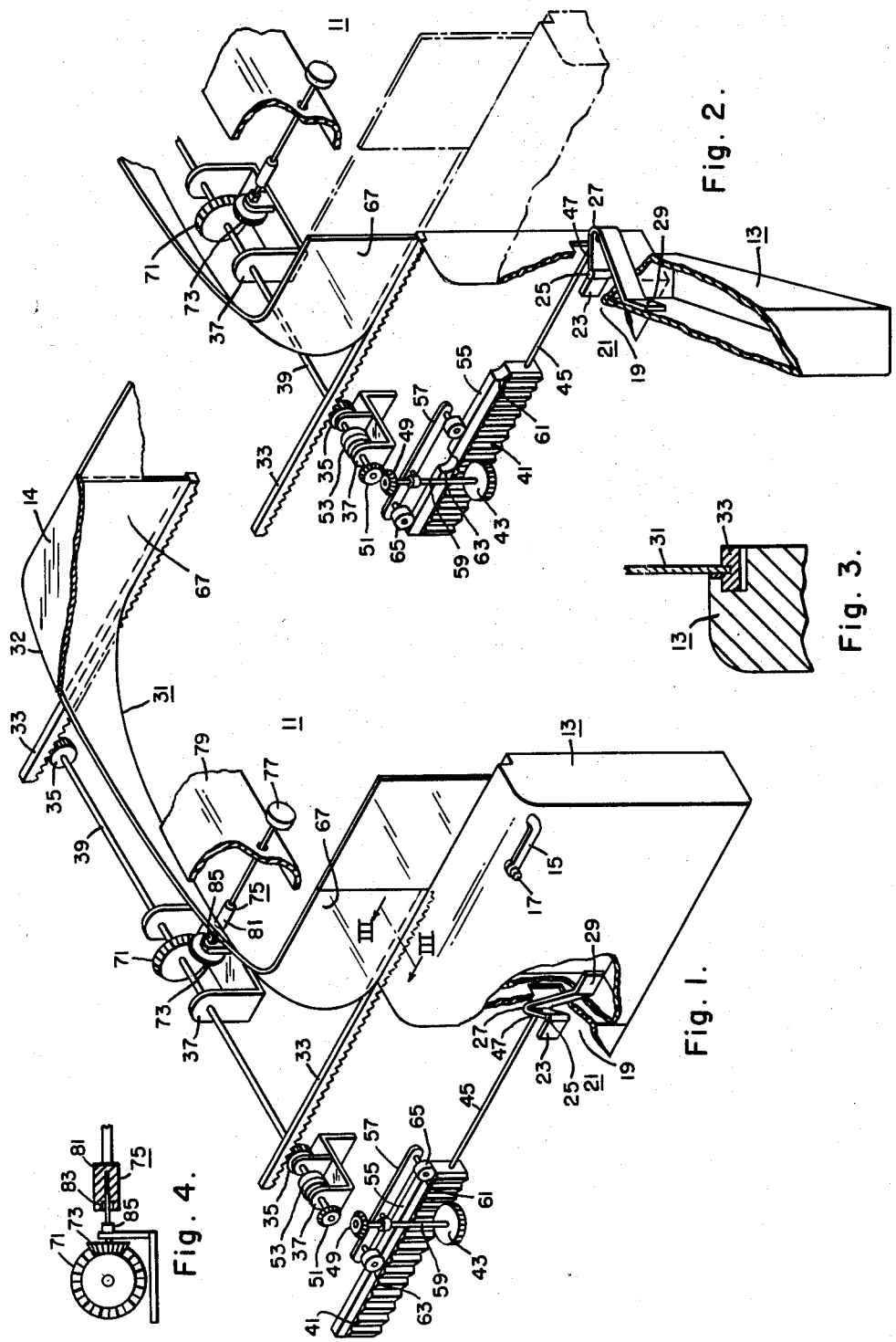

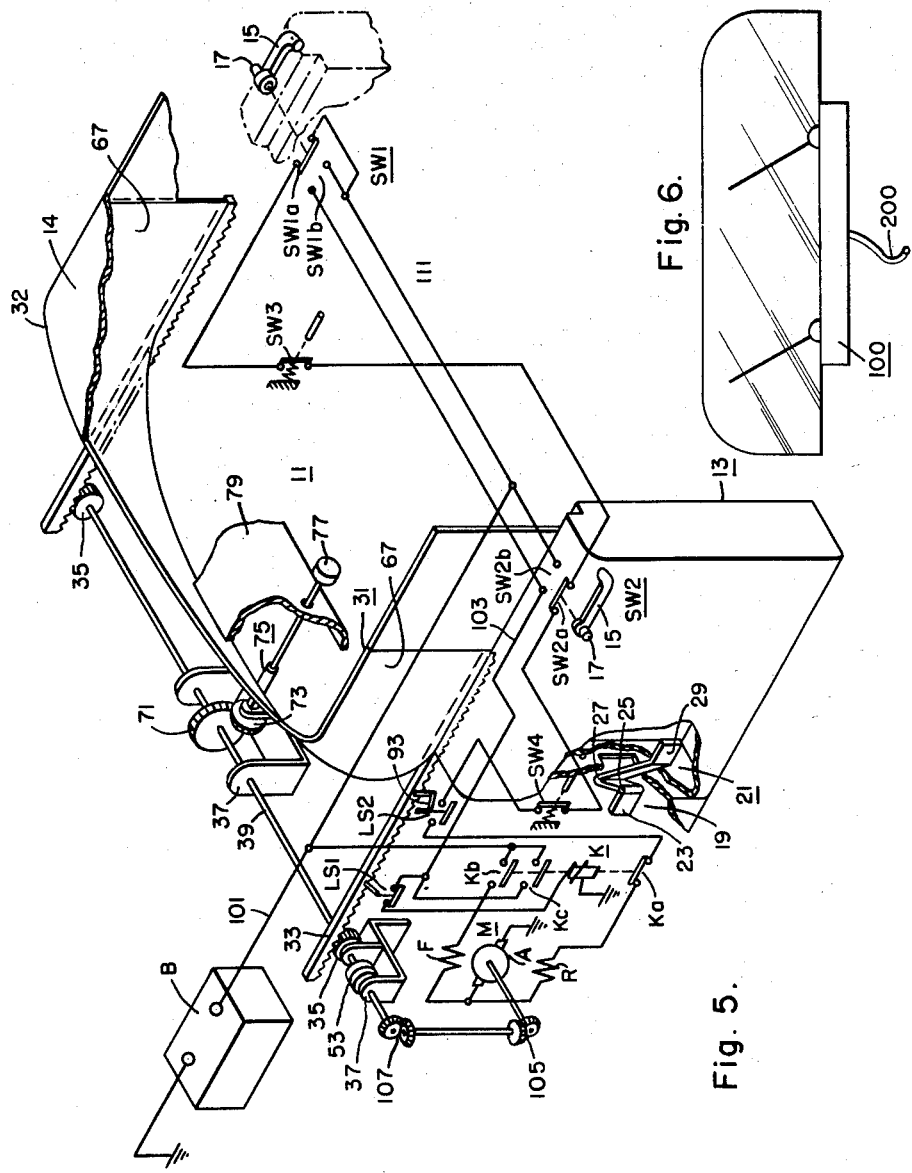

United States Patent Office
3,146,020
Patented Aug. 25, 1964

3,146,020
WINDSHIELD ARRANGEMENT FOR VEHICLE
Myers Nobel, Hopwood, Pa.
(Box 560, Star Rte., Cave Creek, Ariz.)
Filed Dec. 15, 1960, Ser. No. 75,985
5 Claims. (Cl. 296—84)

This invention relates to the automotive-vehicle art and has particular relationship to windshields for automobiles. It is an object of this invention in its broadest aspects to provide an automotive vehicle with an integral windshield which shall be devoid of visual obstructions such as the usual corner posts. The windshield of such a vehicle is of generally horizontal U-section with the wings or arms of the U arced rearwardly of the vehicle so that they extend over the door frames blocking ingress to, and egress from, the vehicle through the doors. It is then necessary to remove the windshield from the door frames when the doors are to be opened to permit ingress to and egress from the vehicle and it is a specific object of this invention to provide novel means for so removing the windshield.

In vehicles in accordance with the teachings of the prior art the windshield is pivoted upwardly from a horizontal position to free the doors for ingress and egress. Since the windshield must be pivoted upwardly to a substantial height to clear the doors effectively the effective height of the vehicle is thus increased substantially when the windshield is raised. The ceilings of most home garages presently available are about eight feet or less from the floor, and would not afford adequate clearance for pivoting the windshield to a position such as to clear the doors. Thus the prior art vehicles could not be parked in a home garage because the driver of such a vehicle could not within the garage raise the windshield adequately to leave the vehicle.

In addition, in prior art vehicles the raising of the windshield permits rain or snow to penetrate into the vehicle. The freeing of the doors outdoors in bad weather is then not feasible.

It is then a specific object of this invention to provide a vehicle having a windshield of generally U horizontal section which is devoid of corner ports and the arms of which extend over the door frame which windshield shall be removeable to clear the doors for ingress or egress without substantially increasing the height of the vehicle and without opening the top of the vehicle to rain or snow. It is an incidental object of this invention to provide such a vehicle including novel ventilating facilities.

In accordance with this invention a vehicle is provided in which the windshield is moved forwardly to free the doors for ingress or egress. In accordance with the broader aspects of this invention the movement of the windshield may be carried out by moving the windshield physically by hand or by energizing a motor by means of a push button on the dash board to move the windshield. In accordance with a more practical, hence more important, aspect of this invention, the movement forwardly is effected responsive to the opening of one or the other of the doors and the return movement in response to the closing of the last door to be closed. The windshield drive may be mechanically actuated by the door or the windshield may be motor operated, the motor being energized by release of a door latch to open the windshield and by the closing of the last door to close the windshield.

In accordance with an ancillary aspect of this invention, means is provided for setting the windshield in a position intermediate the open and closed positions. A space is thus provided between the lower and upper rims of the windshield and the body of the vehicle through which the vehicle may be ventilated. This ventilating means is operated independently of the opening and closing mechanism.

The novel features considered characteristic of this invention are disclosed generally above. This invention both as to its organization and as to its method of operation together with additional objects and advantages thereof will be better understood from the following detailed description of specific embodiments taken in connection with the accompanying drawings in which:

FIGURE 1 is a view in perspective showing a portion of a vehicle having incorporated therein a preferred embodiment of this invention in which the operation is principally mechanical;

FIG. 2 is a view in perspective of the embodiment shown in FIG. 1 with a door of the vehicle open;

FIG. 3 is a fragmental view partly in section showing the manner in which the windshield dovetails into the door;

FIG. 4 is a fragmental view partly in side elevation and partly in section showing a portion of the ventilating mechanism;

FIG. 5 is a view partly in perspective and partly diagrammatic showing a modification of this invention in which the operation is principally electrical; and FIG. 6 is a view illustrating wipers on the windshield.

The apparatus shown in the drawing includes a vehicle 11 such as an automobile having at least front doors 13 and a roof 14. Each door 13 has a handle 15 at one end of which there is a button 17 for actuating a latch (not shown) to release the door when it is in the closed position.

The doors 13 are pivotal in a door frame 19 between open and closed positions on hinges 21 (only lower one shown). Each hinge 21 includes a supporting plate 23 secured to the frame 19 provided with a hinge pin 25 about which a generally V-shaped door suspending bracket 27 is pivotal. The bracket has a plate 29 which is secured to the door.

The vehicle 11 has a windshield 31 of generally U horizontal section which is free of obstructions but when closed with the doors 13 in the closed position extends over the doors 13 and dovetails into the upper forward edge 32 of the roof 14. To permit egress from and ingress to the vehicle through the doors 13 it is essential that the windshield 31 be removable from the doors. One of the important features of this invention is that the windshield 31 is horizontally displaceable from the doors. In the embodiment shown in FIGS. 1 and 2 this object is achieved by actuating the windshield 31 through a rack-and-pinion mechanism from either door 13 when a door is opened or closed.

For this purpose the windshield is provided on each side with a rack 33 which dovetails into the doors 13 when they are closed as shown in FIG. 3. Each rack 33 is movable by a pinion 35 rotatable on bearings 37 supported from the front portion of the vehicle 11 (support not shown in detail). The pinions 35 are secured to a common shaft 39 and are thus rotatable together.

The shaft 39 may be rotated from racks 41 each actuable by a door 13 and cooperative with pinions 43. The rack 41 is connected through a bar 45 to that arm 47 of the bracket 27 which is nearest the pin 25. When the door is opened this arm 47 is pivoted towards the rear of the vehicle 11 moving the rack 41 towards the rear and rotating the pinion 43.

Each pinion 43 is adapted to be coupled to the shaft 39 through bevel gears 49 and 51 and through a slip clutch 53. Each set of bevel gears 49 and 51 are out of engagement when the associated door 13 is closed. This disengagement assures that the operation of one door will not affect the drive of the other. Each gear 49 is moved into engagement with the cooperative gear 51 by cam action produced by cooperation of a cam 55 on the upper edge of the rack 41 and a cam follower 57 which is secured to the shaft 59 common to pinion 43 and gear 49. The cam 55 has recessive surfaces 61 and 63 where the rollers 65 of the follower 57 are engaged in the closed position of a door 13.

When a door 13 is opened and the rack 41 moves rearwardly the rollers 65 move out of the recessions 61 and 63 raising the gear 49 into engagement with the gear 51. The pinion 43 slides upwardly along the rack 41. The rotation of gear 51 rotates shaft 39 thru coupling 53. The pinions 35 are then rotated to move racks 33 outwardly removing the sides 67 of the windshield 31 from the doors 13 to permit ingress to and egress from the vehicle. The gears 49 and 51 are of substantially smaller diameter than the pinion 43 so that relatively small angle rotation of the pinion 43 rotates the gears 49 and 51 over a number of revolutions.

The opening of one door 13 while the other door 13 remains closed does not affect this operation because the gear 49 associated with the latter door is disengaged from the cooperative gear 51. If the closed door 13 is now opened with the windshield 31 in the open position the gears 49 and 51 are engaged but the tendency to rotate of shaft 39 is prevented by the slipping of the associated clutch 53. In the same way the clutch 53 slips when, with the windshield and both doors open, one door is closed.

In accordance with another aspect of this invention the windshield 31 may be partly opened to provide cowl ventilation. For this purpose a bevel gear 71 is mounted on shaft 39. This gear 71 is engaged by a cooperative bevel gear 73 which is rotatable through a coupling 75 by a knurled knob 77 extending through the instrument panel 79. The coupling 75 includes a female member 81 having a rectangular or square groove 83 adapted to engage a rectangular or square stud 85 secured to gear 73. The part 81 is normally held retracted by a spring (not shown). When the gear 73 is to be rotated the knob 77 is pushed inwardly against the spring so that the stud 85 engages the groove 83. Rotation of the knob 77 then rotates shaft 39 and pinions 35 to move the windshield 31 outwardly to ventilate or inwardly. Rotation of shaft 39 from one of the gears 49 does not affect the mechanism 71, 73, 77 because the coupling 75 is normally in disengaged position.

The vehicle 11 shown in FIG. 5 includes a motor M having an armature A and forward and reverse windings F and R, respectively. The motor may also include the usual shunt-field windings (not shown). The motor M is adapted to be energized from the vehicle battery B through the back contact Ka of a contactor K in the reverse direction and through its front contact Kb in the forward direction. The contactor K has a lock-in front contact Kc.

The vehicle 11 also includes switches SW1, SW2, SW3, SW4 and limit switches LS1 and LS2. Switches SW1 and SW2 each have a back contact SW1a and SW2a and a front contact SW1b and SW2b. The switches SW1 and SW2 may be micro switches and are actuable by the respective latch buttons 17 of the doors 13. Switches SW3 and SW4 are held closed with the respective doors 13 closed by each opens at the start of the opening of the door. Limit switches LS1 and LS2 are actuable by the racks 33. Switch LS1 is normally closed but is opened by the rack 33 with the windshield only in the most advanced position. Switch LS2 is actuable by the racks 33 through the cam mechanism 93. The mechanism operates to hold the switch LS2 open over the range from the completely closed position of the windshield 31 to the fully open ventilator position.

The opening operation may be assumed to start from a position in which the doors 13 and windshield 31 are closed. LS1 is then closed and LS2 open. One of the latches 17 may now be actuated. Contactor K is now energized in a circuit including B, conductor 101, SW1b or SW2b depending on which door button 17 has been actuated, conductor 103, LS1, K, ground. With K actuated Kb and Kc close and Ka opens. The contactor K is locked in circuit B, 101, Kc, LS1, K, ground. Latch 17 may now be released without affecting the contactor. Motor M is energized in a forward direction in circuit B, 101, Kb, F, A, ground.

The motor rotates and through bevel gears 105, 107, and slip clutch 53 rotates shaft 39 to move the windshield forward and permit ingress and to egress from the doors. When the windshield 31 travels beyond the full cowl position, LS2 closes. When the windshield 31 is fully opened LS1 opens, deenergizing contactor K and stopping the motor.

To reclose the windshield 31 both doors 13 must be completely closed to close SW3 and SW4 and both latches 17 must be released to close SW1a and SW2a. In this event the motor M is energized in the reverse direction in circuit B, 101, 111, SW1a, SW3, SW2a, SW4, LS2, Ka, R, A, ground. The windshield 31 now returns to the full open cowl position. The cowl ventilator may then be closed if desirable by operating button 77.

In the above description only the parts of an automotive vehicle essential to this invention have been mentioned or described. The other parts may have the usual form or may be modified in a manner known to those skilled in the art. For example the windshield wipers 100 may be mounted as units on the windshield 31 and connected to their driver through flexible tubes or cables 200.

One of the important features of this invention is that in the open position or in the ventilating position the windshield 31 is removed from the roof 14 but the roof 14 remains over the vehicle (compare FIGS. 1 and 2) protecting the occupants of the front seat from rain or snow.

While preferred embodiments of this invention have been disclosed herein many modifications thereof are feasible. For example, instead of being actuated by rack and pinion mechanisms the windshield could be actuated by a pivoting H frame, one arm of the H being connected between each door and the windshield and the arms being coupled through a slip clutch. This invention then is not to be restricted except insofar as is necessitated by the spirit of the prior art.

I claim as my invention:

1. A vehicle having at least one door suspended from hinge means in the boundary of a door frame in said vehicle and pivotal about said hinge means from a closed position to an open position, said vehicle including a windshield consisting of a transparent structure of generally longitudinal U cross section extending across the front of said vehicle with at least one arm of the U extending over at least a substantial portion of said door when said door is in said closed position, and means connected to said door and to said windshield and responsive to the pivoting of said door to said open position to move said windshield in a generally horizontal direction to remove said windshield from over said frame to permit ready ingress to, and egress from, said vehicle.

2. A vehicle having at least one door in a frame, said door having a closed position and an open position and being actuable between said positions, said door having a latch for latching said door in said closed position, said vehicle including a transparent windshield of generally horizontal U-section and having a closed position in which at least one arm of the U extends rearwardly of the forward part of said frame to block ready ingress to, and egress from, said vehicle through said door, and an open position in which said one arm of the U is displaced from said frame to permit ready ingress to, and egress from, said vehicle through said frame, the U formed by the cross section of said windshield remaining generally horizontal both in said closed position and in said open position, and means connected to said latch and to said windshield and responsive to actuation of said latch in the unlatched position for moving said windshield from said closed position to said open position.

3. A vehicle having at least one door in a frame, said door having a closed position and an open position and being actuable between said positions, said door having a latch for latching said door in said closed position, said vehicle including a transparent windshield of generally horizontal U-section and having a closed position in which at least one arm of the U extends rearwardly of the forward part of said frame to block ready ingress to, and egress from, said vehicle through said door, and an open position in which said one arm of the U is displaced from said frame to permit ready ingress to, and egress from, said vehicle, through said frame, the U formed by the cross section of said windshield remaining generally horizontal both in said closed position and in said open position, means connected to said latch and to said windshield and responsive to actuation of said latch in the unlatched position for moving said windshield from said closed position to said open position, and means connected to said door and to said windshield and responsive to the return of said door from said open position to said closed position for returning said windshield to said closed position.

4. A vehicle having at least one door in a frame, said door having a closed position and an open position and being actuable between said positions, said vehicle including a transparent windshield of generally horizontal U-section and having a closed position in which at least one arm of the U extends rearwardly of the forward part of said frame to block ready ingress to, and egress from, said vehicle through said door, and an open position in which said one arm of the U is displaced from said frame to permit ready ingress to, and egress from, said vehicle through said frame, the U formed by the cross section of said windshield remaining generally horizontal both in said closed position and in said open position, first means connected to said door and to said windshield and responsive to actuation of said door for moving said windshield from said closed position to said open position when said door is moved from said closed position to said open position and for moving said windshield from said open position to said closed position when said door is moved from said open position to said closed position, and second means connected to said windshield and actuable separately from said first means for setting said windshield in a position intermediate said open position and said closed position to provide ventilation for said vehicle.

5. A vehicle having at least a pair of door assemblies, each assembly including a door in a frame, each door being actuable, on operation of the associated assembly, between a closed position and an open position, said vehicle including a transparent windshield of generally horizontal U section and having a closed position in which said arms of said U extend rearwardly of the forward part of the frames of said doors so as to block ready ingress to, and egress from said vehicle through said doors, means responsive to operation of one of said assemblies for moving said windshield to an open position, and means connected to said assemblies for preventing reclosing of said windshield unless both of said doors are in closed position.

References Cited in the file of this patent

UNITED STATES PATENTS

| | | |
|---|---|---|
| 1,258,528 | Brewster | Mar. 5, 1918 |
| 1,631,046 | McCullough | May 31, 1927 |
| 2,105,830 | Aiken | Jan. 18, 1938 |
| 2,369,713 | Burgard | Feb. 20, 1945 |
| 2,464,696 | Lelong | Mar. 15, 1949 |
| 2,539,331 | Saulnier | Jan. 23, 1951 |
| 2,570,434 | Dow et al. | Oct. 9, 1951 |
| 2,836,457 | Beerman et al. | May 27, 1958 |
| 2,963,107 | Farber | Dec. 6, 1960 |
| 3,031,223 | Koplin | Apr. 24, 1962 |